United States Patent
Khoruzhenko

(10) Patent No.: US 11,443,041 B2
(45) Date of Patent: Sep. 13, 2022

(54) FIRMWARE INTEGRITY CHECK USING SILVER MEASUREMENTS

(71) Applicant: Absolute Software Corporation, Vancouver (CA)

(72) Inventor: Eugene Khoruzhenko, Redmond, WA (US)

(73) Assignee: Absolute Software Corporation, Vancouver (CA)

( * ) Notice: Subject to any disclaimer, the term of this patent is extended or adjusted under 35 U.S.C. 154(b) by 0 days.

(21) Appl. No.: 16/639,876

(22) PCT Filed: Apr. 10, 2018

(86) PCT No.: PCT/CA2018/050443
§ 371 (c)(1),
(2) Date: Feb. 18, 2020

(87) PCT Pub. No.: WO2019/036795
PCT Pub. Date: Feb. 28, 2019

(65) Prior Publication Data
US 2020/0364340 A1    Nov. 19, 2020

Related U.S. Application Data

(60) Provisional application No. 62/548,815, filed on Aug. 22, 2017.

(51) Int. Cl.
*G06F 11/00* (2006.01)
*G06F 21/57* (2013.01)
(Continued)

(52) U.S. Cl.
CPC .......... *G06F 21/572* (2013.01); *G06F 21/577* (2013.01); *G06F 21/73* (2013.01); *G06F 21/74* (2013.01)

(58) Field of Classification Search
CPC ........ G06F 21/572; G06F 21/74; G06F 21/73; G06F 21/577
See application file for complete search history.

(56) References Cited

U.S. PATENT DOCUMENTS 8,776,180 B2    7/2014    Kumar
8,856,771 B2   10/2014    Chalmers
(Continued)

OTHER PUBLICATIONS

F. E. McFadden et al., Supply Chain Risk Mitigation for IT Electronics, Proceedings of 2010 IEEE International Conference on Technologies for Homeland Security (HST), Nov. 8-10, 2010, pp. 49-55, IEEE, Waltham, MA, USA.
(Continued)

*Primary Examiner* — Fatoumata Traore
*Assistant Examiner* — Carlton Johnson
(74) *Attorney, Agent, or Firm* — Damien G. Loveland

(57) ABSTRACT

Measurements of a device's firmware are made regularly and compared with prior, derived measurements. Prior measurements are derived from a set of identical firmware measurements obtained from multiple devices having the same make, model and firmware version number. The firmware integrity status is reported on a data and device security console for a group of managed endpoints. Alerts about firmware changes, which may be potential attacks on the firmware, are given automatically.

19 Claims, 4 Drawing Sheets

(51) Int. Cl.
*G06F 21/73* (2013.01)
*G06F 21/74* (2013.01)

(56) References Cited

U.S. PATENT DOCUMENTS

| | | | |
|---|---|---|---|
| 9,081,954 | B2 | 7/2015 | Forristal |
| 9,317,691 | B2 | 4/2016 | Locke |
| 9,471,536 | B1 | 10/2016 | Marr |
| 2004/0025036 | A1 | 2/2004 | Balard |
| 2004/0260913 | A1* | 12/2004 | Babu ............... G06F 11/3612 712/220 |
| 2005/0132177 | A1 | 6/2005 | Challener |
| 2006/0155988 | A1 | 7/2006 | Hunter |
| 2006/0280150 | A1 | 12/2006 | Jha |
| 2007/0277241 | A1 | 11/2007 | Repasi |
| 2008/0126782 | A1 | 5/2008 | Dayan |
| 2008/0250403 | A1 | 10/2008 | Moon |
| 2008/0256363 | A1 | 10/2008 | Balacheff |
| 2008/0289038 | A1 | 11/2008 | Kim |
| 2009/0172639 | A1 | 7/2009 | Natu |
| 2009/0222653 | A1 | 9/2009 | Findeisen |
| 2010/0023777 | A1 | 1/2010 | Prevost |
| 2010/0185845 | A1 | 7/2010 | Takayama |
| 2011/0016524 | A1 | 1/2011 | Guthery |
| 2011/0099117 | A1 | 4/2011 | Schepers |
| 2012/0011219 | A1 | 1/2012 | Zhang |
| 2012/0084549 | A1 | 4/2012 | Mackintosh |
| 2013/0263205 | A1 | 10/2013 | Jacobs |
| 2014/0109076 | A1* | 4/2014 | Boone ............... H04L 63/0823 717/170 |
| 2014/0304520 | A1 | 10/2014 | Bobzin |
| 2015/0163121 | A1 | 6/2015 | Mahaffey |
| 2016/0098561 | A1 | 4/2016 | Keller |
| 2016/0188879 | A1 | 6/2016 | Sussman |
| 2018/0018208 | A1* | 1/2018 | Zettler ............... G06F 11/0739 |
| 2018/0314507 | A1* | 11/2018 | Chien ............... G06F 8/65 |
| 2018/0330093 | A1* | 11/2018 | Shivanna ............... G06F 9/4401 |

OTHER PUBLICATIONS

E. T. Gilmore et al., Infrared Analysis for Counterfeit Electronic Parts Detection and Supply Chain Validation, Environ. Syst. Decis. 33, pp. 477-485, Nov. 23, 2013, Springer Science+Business Media, New York.

J. Butterworth et al., Problems with the Static Root of Trust for Measurement, The MITRE Corporation, Jul. 27-Aug. 1, 2013, pp. 1-7, Blackhat Las Vegas, NV, USA.

A. Regenscheid et al., BIOS Integrity Measurement Guidelines (Draft), Special Publication 800-155, National Institute of Standards and Technology, Dec. 2011, Gaithersburg, MD.

TCG ACPI Specification, Family "1.2" and "2.0", Level 00 Revision 00.37, TCG, Dec. 19, 2014.

* cited by examiner

FIRMWARE INTEGRITY CHECK USING SILVER MEASUREMENTS

TECHNICAL FIELD

The present disclosure relates to the protection of electronic devices from firmware attacks, and in particular relates to automatically deriving benchmark measurements with which to compare firmware measurements.

BACKGROUND

There are increasing attacks on the BIOS (Basic Input/Output System) in electronic computing devices, such as the implanting of rootkits in the BIOS. If the BIOS on a PC (Personal Computer) endpoint is compromised with a rootkit, there is no convenient or automated way at any given point of time to check its integrity and perform remediation. Nevertheless, one way to check integrity of the firmware is to compare a measurement of it with a golden measurement obtained from the manufacturer, but this is not always possible or desirable. Firmware checking applications that use golden measurements must be updated with new golden measurements at the same time that the firmware is updated, otherwise legitimate firmware changes will be unnecessarily and widely reported as suspect. Golden measurements must be made in exactly the same way as the firmware measurements that are compared with the golden measurements. The National Institute of Standards and Technology (NIST) has published a conceptual draft relating to BIOS integrity, entitled "BIOS Integrity Measurement Guidelines" (Publication number 800-155). However, the extent of its implementation is unknown as of the time of writing.

SUMMARY

In order to recognize attacks on a device's firmware, measurements of the firmware are made regularly and compared with prior firmware measurements and/or silver measurements. Silver measurements, which are reputation based measurements, are derived from a set of identical firmware measurements obtained from multiple devices having the same make, model and firmware version number. The comparison of firmware measurements enables additional reporting to users and IT administrators, to alert them about firmware changes. The firmware integrity status may be reported, for example, on a data and device security console for a group of managed endpoints. Real-time alerts can be sent to the IT administrators and end users when firmware updates are detected on their endpoints. Alerts about firmware changes, which may be potential attacks on the firmware, can be given automatically.

An advantage of the invention is that the integrity of the firmware of a device can be checked without having to obtain a golden measurement from the manufacturer, or without manually or otherwise making a golden measurement. The applications that perform the firmware checks do not need to be manually or automatically updated with golden measurements. Instead, the invention detects changes across multiple devices and automatically determines whether the changes are genuine or suspect. Another advantage is that firmware roll-backs can be detected and reported. The embodiments disclosed herein each provide one or more of the above advantages.

Disclosed herein is a method for protecting electronic devices comprising: receiving, by a server from each of a first threshold number of electronic devices, an identically performed firmware measurement, wherein said devices have an identical make, an identical model and a firmware with an identical version number; determining, by the server, that at least a second threshold number of the received firmware measurements are identical; defining, by the server, one of said identical firmware measurements to be a silver measurement; receiving, by a processor, from a further electronic device having the identical make, identical model and firmware with the identical version number, a further identically performed firmware measurement; and comparing the further firmware measurement with the silver measurement.

Also disclosed herein is a system for protecting electronic devices comprising a server; a processor in the server; and a non-transient computer readable memory in the server that stores instructions, which, when executed by the processor, cause the server to: receive from each of a first threshold number of electronic devices, an identically performed firmware measurement, wherein said devices have an identical make, an identical model and a firmware with an identical version number; determine that at least a second threshold number of the received firmware measurements are identical; define one of said identical firmware measurements to be a silver measurement; receive, from a further electronic device having the identical make, identical model and identical firmware version, a further identically performed firmware measurement; and compare the further firmware measurement with the silver measurement.

Still further disclosed herein is a non-transient computer readable medium that stores instructions, which, when executed by a processor, cause the processor to: receive from each of a first threshold number of electronic devices, an identically performed firmware measurement, wherein said devices have an identical make, an identical model and a firmware with an identical version number; determine that at least a second threshold number of the received firmware measurements are identical; define one of said identical firmware measurements to be a silver measurement; receive, from a further electronic device having the identical make, identical model and identical firmware version, a further identically performed firmware measurement; and compare the further firmware measurement with the silver measurement.

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary, the drawings nor the following detailed description purport to define or limit the invention; the invention is defined only by the claims.

DETAILED DESCRIPTION

A. Terminology

Figure 1:
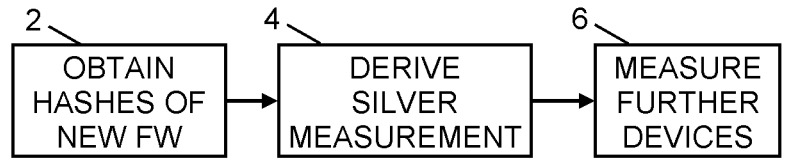
FIG. 1 is a schematic diagram of an overview of the process for checking firmware, according to an embodiment of the present invention.

Device: This is any electronic device or any computing device to be protected, which includes non-volatile memory and a BIOS or its equivalent device firmware stored in the non-volatile memory. Non-limiting examples of a device include a laptop, cell phone, personal digital assistant, smart phone, memory stick, personal media device, gaming device, personal computer, tablet computer, electronic book, camera with a network interface, and netbook. Most devices protected by the invention will be mobile devices, but static devices, such as desktop computers, projectors, televisions, photocopiers and household appliances may also be protected. Many other kinds of electronic devices may be included, such as hi-fi equipment, cameras, bicycles, cars, barbecues and toys, if they include non-volatile memory and a BIOS or equivalent device firmware. Devices are configured to communicate with a remote server, and they may initiate the communications and/or the communications may be initiated by the server. Communications may be via Wi-Fi, SMS, cellular data or satellite, for example, or may use another communications protocol. While the invention is often explained in relation to laptops, it is to be understood that it applies equally to other electronic and computing devices.

ACPI: Advanced Configuration and Power Interface, an industry specification for the efficient handling of power consumption in desktop and mobile computers. ACPI specifies how a computer's basic input/output system, operating system, and peripheral devices communicate with each other regarding power usage. ACPI defines tables that provide the interface between an ACPI-compliant operating system and system firmware. The tables allow for the description of system hardware in a platform-independent manner, and are presented as either fixed-formatted data structures or in AML (ACPI Machine Language).

API: Application Program Interface

BIOS: Basic Input/Output System. This performs a power-on self-test of the hardware during the booting process of an electronic device, initializes the hardware, and provides runtime services for operating systems and programs. BIOS is an example of device firmware.

CHIPSEC: A framework for analyzing the security of PC platforms including hardware, system firmware (BIOS/UEFI), and platform components. It includes a security test suite, tools for accessing various low level interfaces, and forensic capabilities.

Computer readable medium: A computer memory or memories of one or more different types, each capable of storing computer readable instructions and/or computer readable data.

FIC: Firmware Integrity Check, a process of the present invention in which the current firmware measurement of a device is checked against a prior firmware measurement and/or a silver measurement.

Firmware: Programming instructions that provide control, monitoring and data manipulation for electronic devices. Firmware is typically stored in non-volatile memory components such as ROM (Read-only Memory), EPROM (Electronically programmable ROM), or flash memory in the device. Firmware such as the ROM BIOS of a personal computer may contain only elementary basic functions of the computer and may provide services to higher-level software. Changing the firmware of a device may occasionally be done during its lifetime, for example for updating the firmware, fixing bugs or adding features. Firmware may employ settings that are stored within the firmware or elsewhere in the non-volatile memory in the device. When used herein, the term "firmware" means device firmware such as BIOS, UEFI or similar, unless specifically stated otherwise.

Golden Measurement: In assessing the firmware measurements of devices, a measurement assessment authority (MAA) references a set of characteristics. These characteristics come in two varieties: (1) endpoint attributes and measurements of BIOS code provided and vouched for, using certificates, by the Original Equipment Manufacturer (OEM), Value Added Reseller (VAR), or an Independent Software Vendor (ISV); and (2) measurements of configuration settings either gathered by the user/administrator of the endpoint during initial provisioning of the endpoint or by the MAA. The assemblage of ideal measurement characteristics is referred to as a golden measurement.

Hash: A hash function is any function that can be used to map data of arbitrary size to data of fixed size. The values returned by a hash function are called hash values, hash codes, digests, hash sums, or simply hashes.

NIST: National Institute of Standards and Technology

NVRAM: Non-Volatile Random Access Memory

OEM: Original Equipment Manufacturer

OS: Operating System

PCR: Platform Configuration Register, a storage register that is used to hold a value that summarizes all the measurement results that were presented to it and the order in which those values were presented to it. The PCR is hosted by the TPM (Trusted Platform Module). The PCR has two advantages: an indefinite number of results can be stored in a single register, and no measurement results need to be discarded to make room for new measurement results.

Processor: This term may be used to refer to a single computer processor or multiple computer processors.

RAM: Random Access Memory

Roll-Back: The change of software or firmware present on a device from its present version to an older version.

Rootkit: A collection of computer software programs, typically malicious, designed to enable unauthorized access to a computer or areas of its software that would not otherwise be allowed, and/or to mask its existence or the existence of other malicious software.

Silver measurement: A reference measurement of firmware that is derived from multiple identical measurements of different copies of the same piece of firmware present on different devices of the same make and model. A silver measurement covers firmware code (i.e. computer readable instructions) but excludes firmware settings, since the latter can be intentionally changed.

SMM: System Management Mode, an operating mode of a device in which all normal execution, including the operating system, is suspended and separate, special software, which is usually part of the firmware or a hardware-assisted debugger, is executed with high privileges.

SPI: Serial Peripheral Interface

TCG: Trusted Computing Group, a group formed to implement trusted computing concepts across personal computers.

TCPA: Trusted Computing Platform Alliance, the former name of the Trusted Computing Group TPM: Trusted Platform Module, a dedicated microcontroller designed to secure hardware by integrating cryptographic keys into devices. The TPM hosts the above-mentioned PCRs. The TPM specification was written by the TCG.

UEFI: Unified Extensible Firmware Interface, a specification that defines a software interface between an operating system and platform firmware. The UEFI is stored as firmware in non-volatile memory.

WMI: Windows Management Instrumentation

B. Overview

Referring to FIG. 1, a brief overview of the process for checking the integrity of firmware is shown. In step 2, hashes of newly updated firmware are obtained from multiple devices. In step 4, the hashes are analyzed in order to derive a silver measurement of the newly updated firmware. In particular, when multiple devices of the same make, model and firmware version have hashes that are the same, then the particular value of the hash is deemed to be a silver measurement of the particular make, model and firmware version. In step 6, the firmware of further devices is measured to provide hashes, each of which is compared to the silver measurement corresponding to the device's particular make, model and firmware version. If the comparison results in a match, then those devices with a match can be considered to have firmware that is not compromised. The devices that do not have a match can be considered to have their firmware compromised.

C. Exemplary Embodiment

Figure 2:
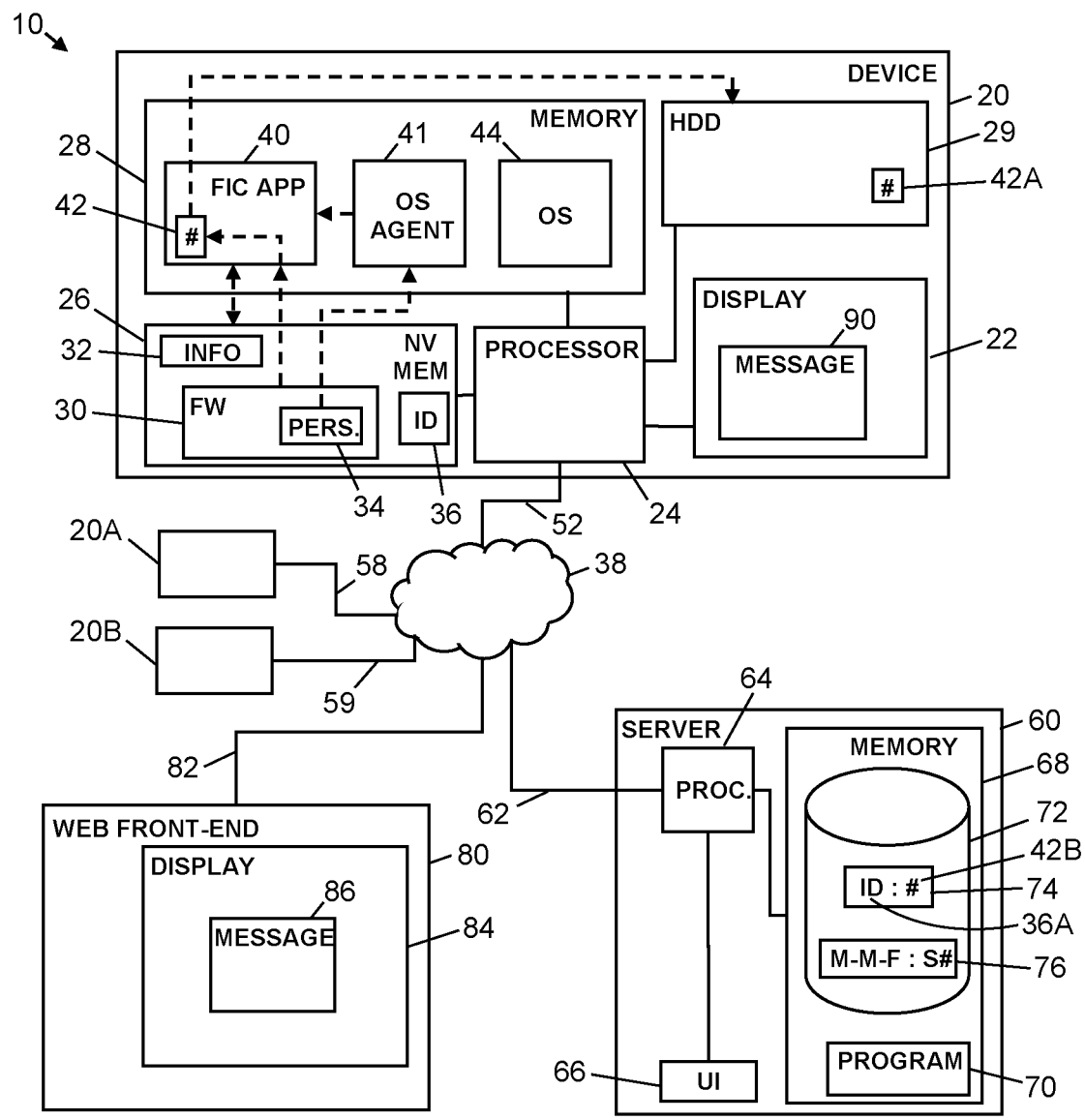
FIG. 2 is a schematic diagram of a system for firmware integrity checking, according to an embodiment of the present invention.

A symbolic block diagram of an exemplary embodiment of the system 10 for checking the firmware integrity of a device 20 is shown in FIG. 2. The device 20 typically includes a display 22, one or more processors 24 and non-volatile memory 26, which may be split into two or more constituent memories. The device 20 also includes further, volatile memory 28, such as RAM. The device 20 may also include a hard disk drive (HDD) 29, solid state drive or other long-term storage.

Present in the non-volatile memory 26 (e.g. NVRAM) of the device 20 is firmware 30, which may be any type of device firmware such as BIOS, UEFI or firmware that performs comparable functions to BIOS or UEFI. The firmware 30 may be divided into multiple volumes, and includes both code and data. Each volume may store data, code, or both data and code. The non-volatile memory 26 also includes an identification 36 of the device 20, an information module 32 and a persistence module 34. The persistence module 34 is normally located inside the firmware 30. The non-volatile memory 26 may store several firmware images of different kinds as well as other non-firmware data. The information in module 32 saved in non-volatile memory 26 includes, for example, non-volatile BIOS settings, such as overclock settings, persistence activation state, enable/disable Secure Boot, and many other static BIOS settings. The information module 32 may not necessarily be a single or specifically defined module, but may include a collection of unrelated registers or other data storage areas, for example, which are collectively referred to herein as an information module for convenience. Dynamic information such as whether USB devices are attached to the device 20, is kept by the BIOS in memory 28. Also, the log (TCPA table), along with other ACPI tables, are produced dynamically by firmware 30 and also stored in memory 28.

The FIC application 40 is maintained in the volatile memory 28 by the OS agent 41. The OS agent 41 does not itself include any applications, such as the FIC application, but exists to maintain a communication link to the server 60. The server 60 transfers the FIC application 40 and other applications as necessary to the device through the OS agent's communication channel with the server. The persistence module 34 ensures that the OS agent 41 is present in an uncompromised state in the volatile memory 28 of the device 20, or elsewhere in the device. If the OS agent 41 is not present in the device 20 or is found to be compromised upon boot, the persistence module 34, which includes a mini-agent embedded in it, restores the OS agent directly from flash memory or any other storage within the device, without any internet connection to the device. It is also possible, in other embodiments, for the persistence module to reload the OS agent 41 across the internet, if the persistence module has internet connectivity.

The FIC application 40 is responsible for calculating a measurement of the firmware 30, which may be a hash 42. When FIC application 40 performs its measurements, the persistence module 34 is measured along with the rest of the firmware 30 because the persistence module is part of the firmware. The FIC application 40 stores the hash 42 as a hash 42A in the HDD 29 or equivalent storage using the OS's cryptographic API. The FIC application 40 can make use of functions of the operating system 44 to read the contents of the non-volatile memory 26, to change settings in it and to write data to it. Versions of the firmware 30 can be read using OS interfaces such as WMI, or they can be discovered in a more direct way using the FIC application 40, and then stored in the information module 32. Firmware version numbers may include numerical digits, letters and/or other characters or symbols.

After the device has booted, the FIC application 40 can periodically measure the firmware 30 and compare the measurements with previously stored results that have been stored in the HDD 29. The volatile memory 28 may contain ACPI tables that contain a measurement log, which can be verified with TPM PCR registers. UEFI firmware may create the ACPI tables. The log can be checked with prior logs and/or silver measurements. The UEFI firmware volumes can be copied from non-volatile memory 26 by the FIC application 40, parsed, and measured as a whole as opposed to the TPM-based method. Firmware volumes are located in non-volatile memory 26 and mapped at a specific location in CPU (central processing unit) address space, so the FIC application 40 can, via an OS device driver, map and copy firmware volumes from non-volatile memory address space into the main memory 28.

In the TPM-based method, an immutable BIOS boot block stores measurements in PCRs on the TPM. A PCR register in the TPM is combined with a nonce and signed by a TPM-resident key to create a report on the BIOS code present at boot time. The measurement as a whole can either be done in conjunction with the TPM-based method or on its own if there is no TPM, or if the BIOS does not generate the TCPA table. This may require a kernel driver to directly access the memory 26 and ACPI tables in the information module 32. As ACPI tables can be accessed via an OS API, however, use of a kernel driver is not obligatory. In Linux™ systems the ACPI tables are mapped in a virtual file system. A kernel driver would be necessary in other situations, such as reading BIOS from flash, reading SPI controller registers, etc. Other, known types of measurement may also be used.

As a separate check, the FIC application 40 can periodically read the non-volatile memory 26, which includes e.g. flash regions and controller lock registers, in a way similar to that performed by the CHIPSEC utility, and report/alert if any region of the flash is unlocked. This requires a kernel driver to access the physical hardware registers.

The device 20 is connected via communications link 52 and the internet 38 or other network to a server 60, which is connected to the internet via link 62. Further devices 20A, 20B which are similar in function to device 20, for which the firmware is to be monitored, are connected to the server 60 via the internet 38 and links 58, 59 respectively. The server includes one or more processors 64, user interface 66 and one or more memories 68. The memory 68 stores one or more programs 70 for interacting with the devices 20, 20A, 20B and storing information related to their firmware in database 72. In particular, the database 72 includes data entries 74 that relate identifications of specific devices 20, 20A, 20B to their firmware, for example using firmware hashes. For example, data entry 74 includes a copy 36A of the device identification 36 stored in relation to a copy 42B of the hash 42 of the firmware 30. The database 72 also includes entries 76 that relate device makes, models and their firmware versions (M-M-F) to silver measurements (S #) of the corresponding firmware. A database 72 includes the type of the flash controller and flash part of the device so that the FIC application 40 knows how to access the flash lock registers on different platforms. Over time, additional functionality can be added to the database.

A web front-end 80, which is a further computing device, is connected to the server 60 via communications link 82 and the internet 38. Alerts indicating a change in the firmware 30 of device 20 are presented as popup messages 86 on the display 84 of the web front-end 80, which can also trigger emails or other messages to IT administrators. The system 10 can also alert the end user directly with a popup message 90 or lock the display 22 of the device 20, depending on the particular policy selected.

D. FIC Application Process

Figure 3:
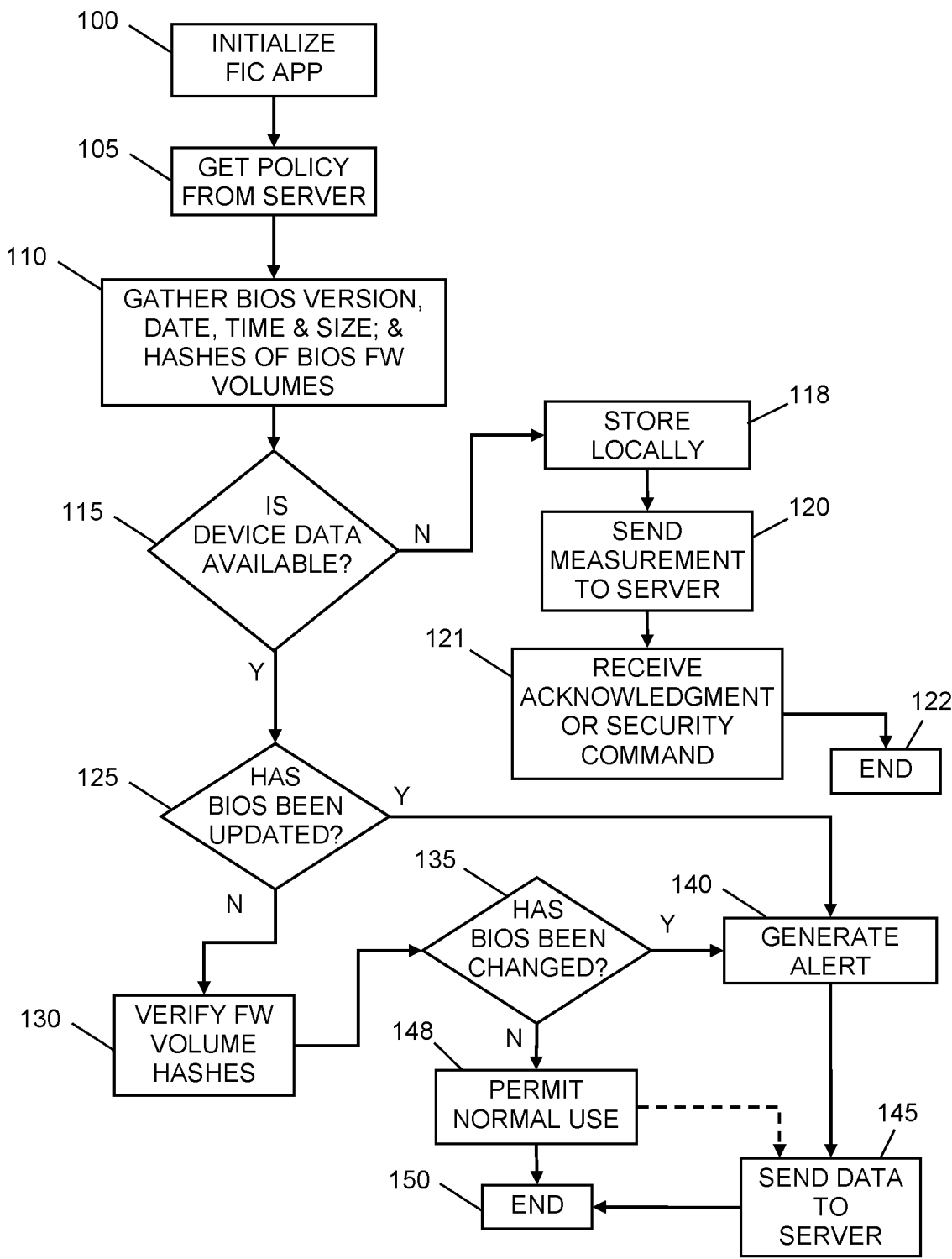
FIG. 3 is a flowchart of a process for providing a device's firmware data to a server, carried out by a firmware integrity check application installed in the device, according to an embodiment of the present invention.

Referring to FIG. 3, a flowchart is shown of an exemplary process undertaken by the FIC application 40 in a device 20 in which the firmware is BIOS. In step 100, the FIC application 40 is initialized, which is achieved by loading, installing and running it in the device 20, under control of the persistence module 34.

In step 105, the FIC application 40 receives a policy from the backend, i.e. the server 60. The policy includes instructions for the FIC application 40 as to which parts of the firmware 30 to measure, how to measure them and how often to measure them, etc. The server 60 sends the policy and commands to the device 20, and the device sends data to the server. In some embodiments, the server informs the FIC application 40 on the device 20 whether its measurements are OK or not. However, this status information may be intentionally withheld from a compromised device if it is desired that the server continue to monitor the compromised device, while keeping a user of the device unaware that the status has been determined.

In step 110, the application 40 gathers, from the device, the device's BIOS version, the date and time of its build, and its size. It also calculates a hash 42 of the firmware 30, or a different hash for each volume of the firmware. Optionally, it gathers the I/O ports to enable/disable SMM and other parameters including published ACPI, SMBIOS, and/or other standard interfaces.

If, in step 115, there is no information previously saved on the device by the FIC application (i.e. firmware version, firmware date, firmware time and/or firmware hash) with the policy relating to the specific device, then the application 40 proceeds to step 118. In step 118, the gathered information and hashes from step 110 are securely saved locally and sent to the server 60 in step 120. When the FIC application 40 runs for the first time it takes the baseline measurement, saves it securely on the device 20, and sends to the server 60. When the FIC application next runs, it can then compare a new measurement with the saved baseline measurement, and, if different, send the new measurement to the server if instructed to do so by to the policy. Optionally, in step 121, the device may receive an acknowledgment from the server if the measurement is acceptable, for example if it corresponds to a silver measurement. Alternately, the optional message back from the server may be a command to take a security action, if the measurement does not equal a corresponding silver measurement. The process then ends in step 122.

Referring back to step 115, if the specific device information (i.e. firmware version, firmware date, firmware time and/or firmware hash) has been previously gathered from the device 20 under control of the policy, which informs the FIC application 40 where to get the device specific information, then the process moves to step 125. In step 125, the FIC application 40 determines whether the BIOS has been updated. This is done by comparing the current data obtained in step 110 with the previous data stored earlier in step 118. For example, this is achieved by comparing the current BIOS version number with the prior BIOS version number; the current BIOS build date with the prior BIOS build date; and/or the current BIOS size with the prior BIOS size. If the BIOS has been updated, then, in step 140, the FIC application 40 generates an alert and the new information is sent to the server in step 145, after which the process ends in step 150. Optionally, the device may receive an acknowledgment from the server or a security instruction before the process ends. The alert is displayed as a popup or message 90 on the display 22 of the device 20, e.g. "Your device firmware was upgraded from version x to y; if you did not authorize the upgrade, shutdown the computer and contact your administrator. Unauthorized firmware change may be a sign of a hacker attack."

If, in step 125, the FIC application 40 determines that the BIOS has not been updated, then the process moves to step 130, in which the FIC application compares the current hashes with the prior hashes. If, in step 135, the BIOS has been changed, then, in step 140, the FIC application generates an alert and the new information is sent to the server in step 145, after which the process ends in step 150. In conjunction with the alert, the process may lock the device or permit restricted use only of it until the change in the BIOS has been verified to be legitimate. As above, the alert is displayed as a popup or message 90 on the display 22 of the device 20. If, in step 135, the BIOS has not been changed, which is determined by the current hash being equal to the prior hash, then the process permits normal or continued and unhindered operation of the device in step 148, and then ends in step 150. In another embodiment, step 145 may be performed after step 148 even if there are no changes to the BIOS, i.e. the data would be sent again even if it has not changed.

The process can be repeated on every boot of the device or periodically, randomly or from time to time, starting from step 105 in which the information is received from the server.

E. Server Process

Figure 4:
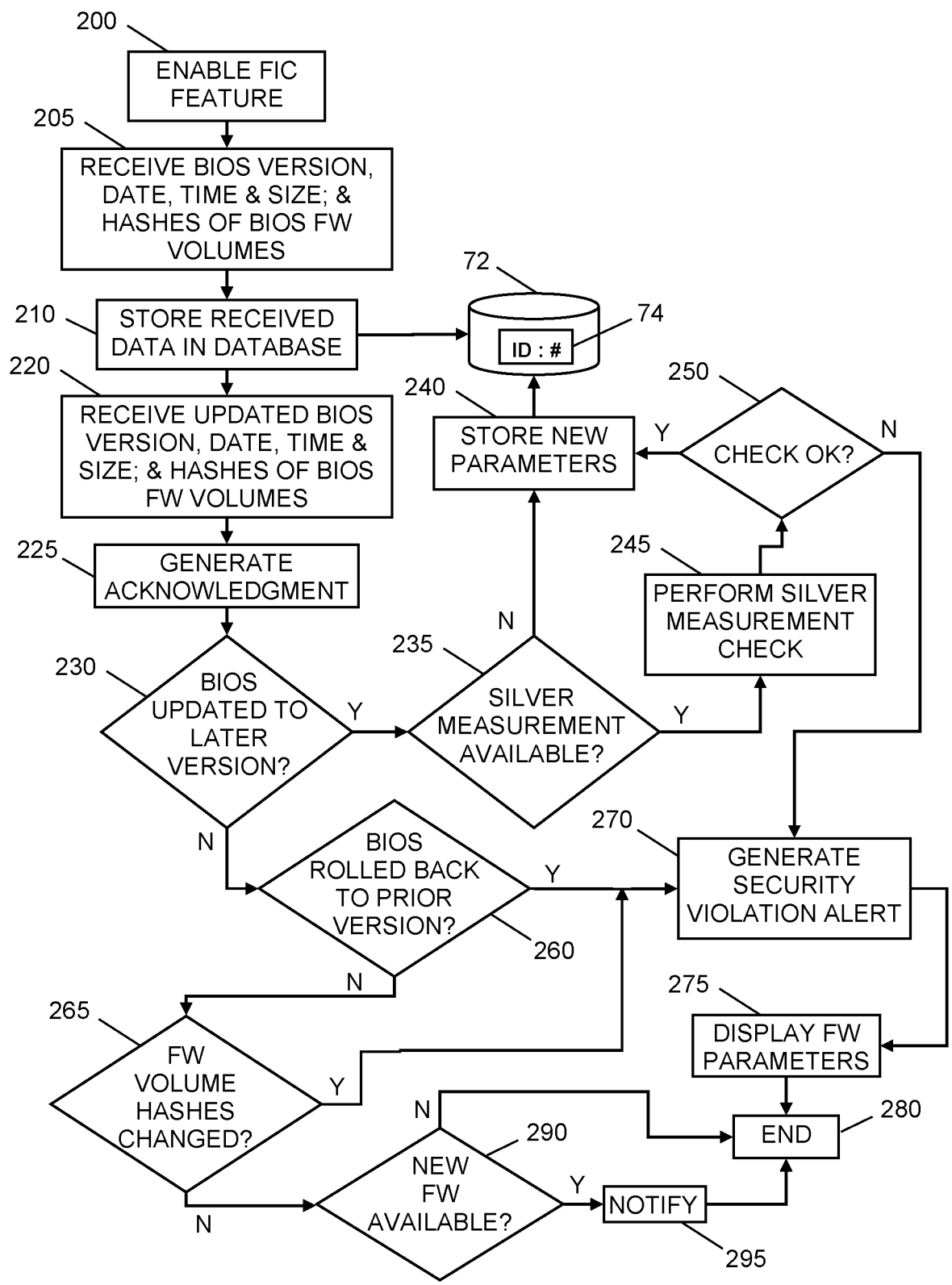
FIG. 4 is a flowchart of a process for checking the integrity of the firmware of a device, carried out by a backend server of the system according to an embodiment of the present invention.

Referring to FIG. 4, in step 200, the FIC feature for the device 20 is enabled, for example by an administrator setting a flag in server 60 that indicates that the feature should be present on the device. When the OS agent 41 in device 20 communicates with the server 60, the server reads the flag and instructs the OS agent to initialize the FIC application 40.

In step 205, the server 60 receives the BIOS version, build date and time, BIOS size and hashes of the firmware volumes from the FIC application 40 for the first time. This is achieved as a result of the FIC application 40 performing step 120 of FIG. 3.

In step 210, the server 60 stores the received information (i.e. BIOS version, build date and time, BIOS size and hashes of the firmware volumes) in the database 72, in a record 74 that links it to an identification 36 of the device.

In step 220, the server 60 receives updated information including the current firmware measurement for the device, as a result of the FIC application 40 performing step 145 of FIG. 3. In step 225, the server 60 generates an acknowledgment that indicates that information has been received. In step 230, the server determines whether the BIOS firmware has been updated to a later version, for example by comparing the currently received firmware version number with a previously received firmware version number from the same device. If it has, then, in step 235, the server determines whether a silver measurement is available. If a silver measurement is available, then, in step 245, the server performs a silver measurement check. This is done by comparing the current firmware measurement with the silver measurement and determining whether there is a difference between the two. If, in step 250, the result of the check is OK, i.e. there is no difference between the current firmware measurement and the silver measurement, then the new information and optionally the OK status are stored in record 74 in the database 72, in step 240. The status indicates that at the date and time of the check, the firmware 30 is OK. As well, a message may be sent back to the device to inform it that the update in its firmware is legitimate and that it may continue with its normal and unhindered operation. If the result of the silver measurement check is not OK in step 250, a security violation alert is generated in step 270.

Returning to step 235, if a silver measurement is not yet available, then the new information is stored in step 240 in the database 72 as record 74, or as an addition to record 74.

Returning to step 230, if the server determines that the BIOS has not been updated to a later version, the server then determines, in step 260 whether the BIOS has been rolled back to a prior version. The server identifies a roll-back of the BIOS by determining that the currently received firmware version number is earlier than the previously stored firmware version number from the same device. If the firmware has been rolled back, then, in step 270 the server generates a security violation alert. If the BIOS has not been rolled back to a prior version, then the server determines, in step 265, whether the hashes of the firmware volumes have been changed. If they have been changed, then, in step 270, the server generates a security violation alert. If the hashes have not changed, as would be the case if step 145 is performed following step 148, the server determines whether a later BIOS version is available in step 290. If there is not a new BIOS available, the process ends at step 280. If a new BIOS is available, i.e. the current firmware is out of date, then a notification is sent to the IT administrator and/or the user of the device 20 in step 295, after which the process ends in step 280. The server can also check whether it is aware of a newer version of the firmware 30, and, if so, sends an alert to the user that a BIOS update is available, and to the IT administrator that the device 20 still uses an older BIOS.

After each security violation alert in step 270, the parameters that caused the alert are displayed on the user interface 66 of the server and/or as a pop-up 86 or other message on a web front-end computer 80 in step 275. In some embodiments, alerts may also be communicated from the server 60 to the device 20 for display on the display of the device, or to trigger a security response in the device such as a lock-down. After generation of a security violation alert in step 270, the server may send a message to the device to instruct it to freeze, to delete data therefrom, to transmit data to the server, to reduce its functionality, or to transmit its location such that it can be tracked. Other security measures are also possible. Following this, the process ends in step 280. The process is then repeated from step 220 as and when it receives new data from the device.

If the flag in the server 60 for the FIC feature is not set, then the OS agent 41 of the device 20 will either disable the FIC application 40 if it is present in the device or refrain from enabling it if it is absent from the device.

When measuring the firmware, care should be taken to measure the code rather than the data, otherwise the measurements may become meaningless. However, it is conceivable that the measurements may include a permissible range of allowed data and/or settings if the measurement checks can allow for it.

F. Silver Measurement Determination

Figure 5:
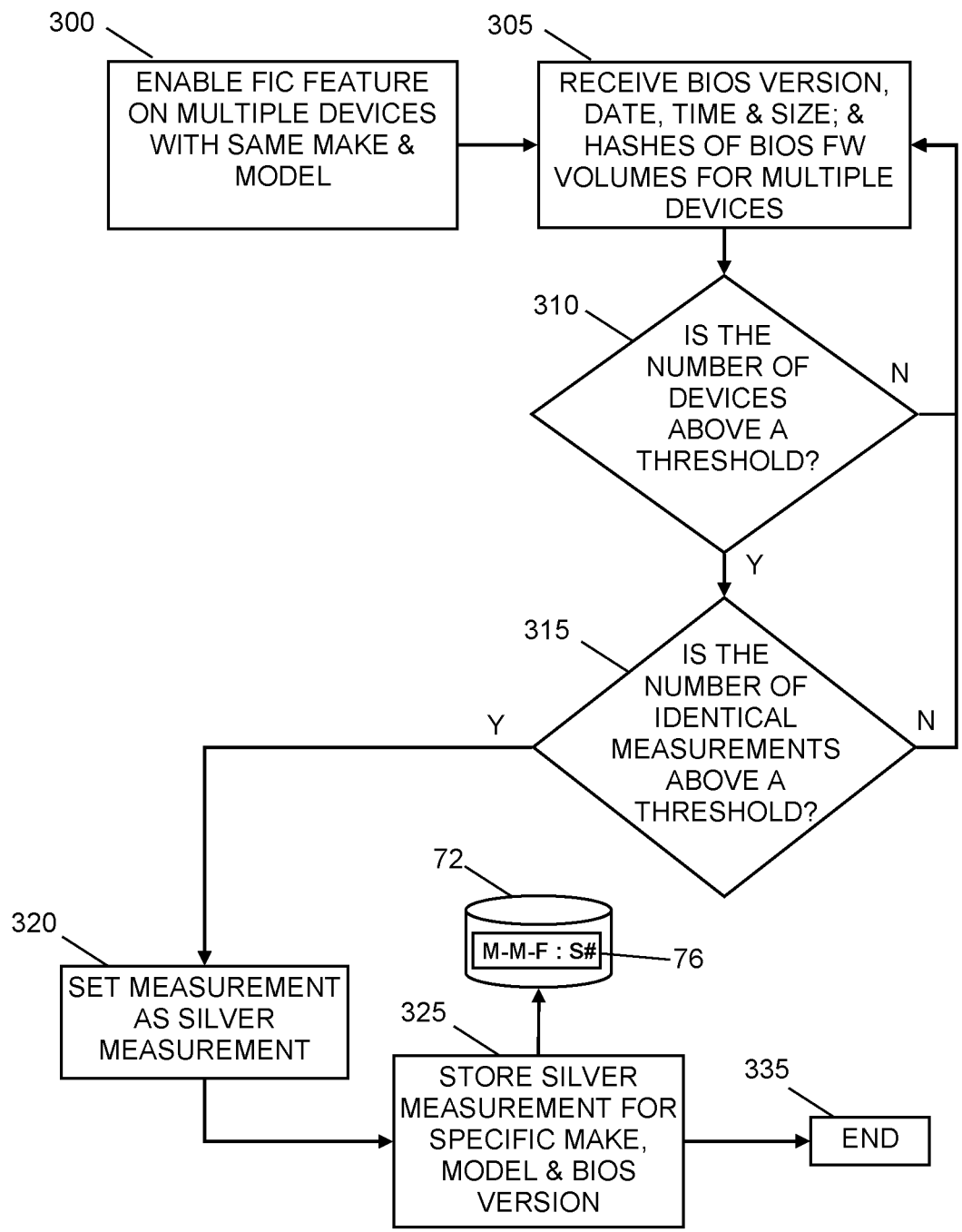
FIG. 5 is a flowchart of a process for automatically deriving silver measurements, carried out by the server of the system according to an embodiment of the present invention.

Referring to FIG. 5, an exemplary process for deriving a silver measurement is shown. In step 300, the FIC feature is enabled on multiple devices having the same make, model and firmware version. In step 305, the server receives the BIOS information for the multiple devices, including the build date, time and size, and hashes of the firmware volumes. The hashes must all be calculated in the same way in order to provide consistent results. In step 310, the server determines whether the number of devices for which the BIOS information has been received is above a first threshold number. If the number of devices does not meet the first threshold, the server proceeds to wait, and then later receives BIOS information from more devices, by returning to step 305.

As an example, the first threshold number of devices may be equal to 10. However, in other embodiments the first threshold may be different, configurable and/or adjustable, either manually or automatically, and the actual value may be based on statistical data.

Once the first threshold has been reached, the server determines, in step 315, whether the number of devices that have identical information is above another, second threshold (which may either be the same number as the first threshold or a lower number). This second threshold may be 9, for example, which, if the first threshold is 10, would indicate with a relatively high probability that these 9 devices are uncompromised. The 1 device out of the 10, which has different information, may likewise be considered to be compromised with a relatively high probability. If the number of devices with identical measurements is not equal to or above the second threshold, then the process reverts to step 305 to receive BIOS information from more devices.

If, in step 315, the number of devices that report identical BIOS information is equal to or above the second threshold, then, in step 320, the hash of the reported identical BIOS information is set as the silver measurement for the specific make, model and firmware version of the device. In step 325, the silver measurement (S #) is stored in the database 72 in a record 76 that links to the specific make, model and firmware version (M-M-F) of the device. The process ends in step 335, and may be repeated for other makes, models and/or firmware versions of devices that are to have their firmware integrity checked.

The result is that the server can look at new firmware, analyze it, and automatically determine whether it is genuine or suspect without having to compare it with a pre-existing benchmark. Once the new firmware is determined to be genuine, it is defined as a silver measurement. The silver measurement can then be used as a benchmark for checking the firmware of further devices.

G. Variations

Note that the information obtained in step 110 (FIG. 3) may simply be a repeat of existing information, but received at a later time or date, which would indicate that the firmware 30 has not changed. In some embodiments, the device itself may not detect the change in the firmware, but leave the detection of change to the server 60 to perform.

Thresholds in the determination of the silver measurement may be different depending on the identity of the devices that initially contact the server with an updated firmware version. Lower thresholds may be used if the measurements are coming from devices that are, or become, known to be less susceptible to firmware attacks than other devices. The thresholds may be different depending on make, model, number of identified firmware attacks, location of the devices, owner of the devices, configuration of the devices, etc. The thresholds may also vary with time.

In a basic embodiment, the silver measurement may include a firmware version number and firmware date and time. An intermediate embodiment may further include one or more of the actual firmware volume measurements. An advanced embodiment may ultimately completely satisfy the NIST guidelines referred to above. Another possible variation is to include measurements of the firmware settings and to discover which combinations are disallowed by the customers.

Functions described as being performed by one server may be divided between separate servers, and functions described as being performed on multiple servers may be combined on the same server. Intermediate servers may also be employed in the system.

Steps in the flowcharts may be performed in a different order to that illustrated, or they may be combined where shown separately. Steps may be omitted and others added, and steps from different flowcharts may be interchanged, all without departing from the scope of the invention. Components shown herein may be divided into constituent components or be combined with each other.

While the invention has been described predominantly with respect to BIOS, it applies equally to UEFI and other types of firmware.

In other embodiments, the persistence module is a form of firmware, but not considered to be device firmware.

In general, unless otherwise indicated, singular elements may be in the plural and vice versa with no loss of generality. Drawings are not to scale or in proportion.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. Computer readable memory or media described herein are all non-transitory in that they store computer readable instructions and/or computer readable data either permanently or temporarily. A medium that can only support a propagating signal without storing it is considered to be transitory.

The present description includes the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

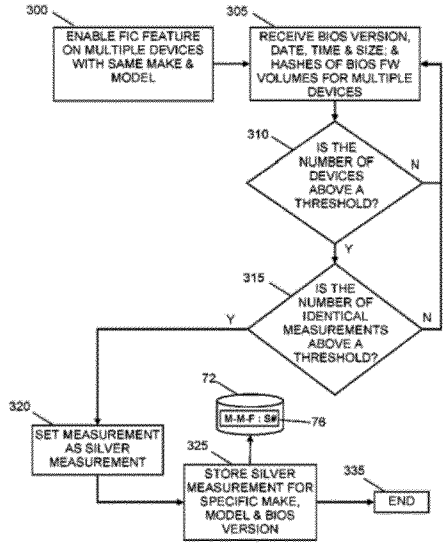

The invention claimed is:

1. A method for checking firmware integrity of electronic devices comprising:
   receiving, by a server from each of a first threshold number of electronic devices, an identically performed firmware integrity measurement, wherein said devices have an identical make, an identical model and a firmware with an identical version number;
   determining, by the server, that at least a second threshold number of the received firmware integrity measurements are identical;
   defining, by the server, one of said identical firmware integrity measurements to be a silver measurement;
   receiving, by a processor in the server or in a further electronic device having the identical make, identical model and firmware with the identical version number, a further identically performed firmware integrity measurement from the further electronic device, wherein the firmware integrity measurements and the further firmware integrity measurement are based on measurement of firmware instructions and not on measurement of firmware data or firmware settings, wherein the firmware integrity measurements and the further firmware integrity measurement are hashes; and
   comparing, by the processor, the further firmware integrity measurement with the silver measurement; and
   wherein the second receiving step and the comparing step are repeated periodically, randomly, from time to time or on every boot of the further electronic device, and when the further firmware integrity measurement is different from the silver measurement, the processor generates an alert, sends information, displays a pop-up message on the further electronic device, the server or a web front-end connected to the server, locks the further electronic device or permits restricted use of the further electronic device.

2. The method of claim 1, wherein the processor is in the server.

3. The method of claim 1, further comprising:
determining, by the processor, that the further firmware integrity measurement is different from the silver measurement.

4. The method of claim 3, wherein the security action taken is one or more of:
generation of an alert;
locking of the further electronic device;
display of a pop-up message on the further electronic device; and
display of a pop-up message on the server.

5. The method of claim 1, further comprising:
determining, by the processor, that the further firmware integrity measurement is equal to the silver measurement; and
determining, by the processor, that the firmware of the further electronic device is out of date.

6. The method of claim 1, further comprising:
receiving, by the processor, a different version number from the further electronic device;
determining, by the processor, that the different version number is earlier than the identical version number; and
generating, by the processor, a security alert indicating that the firmware of the further electronic device has been rolled back.

7. The method of claim 1, further comprising:
determining, by the processor, that the further firmware integrity measurement is different from the silver measurement; and
determining, by the processor, that non-volatile memory in which the firmware of the further electronic device is stored is not properly locked.

8. The method of claim 1, further comprising:
determining, by the processor, that the further firmware integrity measurement is equal to the silver measurement; and
permitting, by the processor, continued unhindered use of the further electronic device.

9. The method of claim 1, wherein the firmware integrity measurements and the further firmware integrity measurement are based on either:
the firmware version and a date of the firmware version;
a time of the firmware version; or
one or more volumes of the firmware.

10. The method of claim 1, wherein the firmware is either:
a BIOS (Basic Input/Output System), or a UEFI (Unified Extensible Firmware Interface).

11. The method of claim 1, further comprising storing, by the server, a result of the comparing step in a database.

12. The method of claim 1, wherein the first threshold number is equal to the second threshold number.

13. The method of claim 1, wherein the first threshold number is greater than the second threshold number, the method further comprising:
permitting, by the server, continued unhindered use of those of the electronic devices that have a firmware integrity measurement equal to the silver measurement; and
taking, by the server, a security action with respect to those of the electronic devices that have a firmware integrity measurement different from the silver measurement.

14. The method of claim 1, wherein the firmware integrity measurements and the further firmware integrity measurement are each performed by an application running in volatile memory.

15. The method of claim 14, wherein each application is maintained to be present and functional by an operating system agent running under an operating system of a different one of the electronic devices or the further electronic device.

16. The method of claim 15, wherein each operating system agent is maintained to be present and functional by a persistent agent present in non-volatile memory of a different one of the electronic devices or the further electronic device.

17. A system for checking firmware integrity of electronic devices comprising:
a server;
a processor in the server; and
a non-transient computer readable memory in the server that stores instructions, which, when executed by the processor, cause the server to:
(a) receive from each of a first threshold number of electronic devices, an identically performed firmware integrity measurement, wherein said devices have an identical make, an identical model and a firmware with an identical version number;
(b) determine that at least a second threshold number of the received firmware integrity measurements are identical;
(c) define one of said identical firmware integrity measurements to be a silver measurement;
(d) receive, from a further electronic device having the identical make, identical model and identical firmware version, a further identically performed firmware integrity measurement, wherein the firmware integrity measurements and the further firmware integrity measurement are based on measurement of firmware instructions and not on measurement of firmware data or firmware settings, wherein the firmware integrity measurements and the further firmware integrity measurement are hashes;
(e) compare the further firmware integrity measurement with the silver measurement; and
(f) repeat (d) and (e) periodically, randomly, from time to time or on every boot of the further electronic device; and
(q) when the further firmware integrity measurement is different from the silver measurement, generate an alert, display a pop-up message on the further electronic device, the server or a web front-end connected to the server, lock the further electronic device or permit restricted use of the further electronic device.

18. The system of claim 17, further comprising in each of the electronic devices:
a firmware integrity measurement application running in volatile memory;
an operating system agent running under an operating system of the electronic device and configured to maintain the firmware integrity measurement application present and functional in the electronic device; and
a persistent agent in non-volatile memory of the electronic device configured to maintain the operating system agent present and functional in the electronic device.

19. A non-transient computer readable medium that stores instructions, which, when executed by a processor, cause the processor to:
(a) receive from each of a first threshold number of electronic devices, an identically performed firmware integrity measurement, wherein said devices have an identical make, an identical model and a firmware with an identical version number;
(b) determine that at least a second threshold number of the received firmware integrity measurements are identical;
(c) define one of said identical firmware integrity measurements to be a silver measurement;
(d) receive, from a further electronic device having the identical make, identical model and identical firmware version, a further identically performed firmware integrity measurement, wherein the firmware integrity measurements and the further firmware integrity measurement are based on measurement of firmware instructions and not on measurement of firmware data or firmware settings, wherein the firmware integrity measurements and the further firmware integrity measurement are hashes;
(e) compare the further firmware integrity measurement with the silver measurement; and
(f) repeat (d) and (e) periodically, randomly, from time to time or on every boot of the further electronic device; and
(g) when the further firmware integrity measurement is different from the silver measurement, generate an alert, display a pop-up message on the further electronic device, the server or a web front-end connected to the server, lock the further electronic device or permit restricted use of the further electronic device.

* * * * *

UNITED STATES PATENT AND TRADEMARK OFFICE
CERTIFICATE OF CORRECTION

PATENT NO. : 11,443,041 B2
APPLICATION NO. : 16/639876
DATED : September 13, 2022
INVENTOR(S) : Eugene Khoruzhenko It is certified that error appears in the above-identified patent and that said Letters Patent is hereby corrected as shown below:

On the Title Page

Please replace the title page, with the attached title page, showing the corrected number of claims.

In the Claims

Claim 4 is canceled.

Signed and Sealed this
Ninth Day of May, 2023

Katherine Kelly Vidal
*Director of the United States Patent and Trademark Office*

CERTIFICATE OF CORRECTION (continued)

(12) United States Patent
Khoruzhenko

(10) Patent No.: US 11,443,041 B2
(45) Date of Patent: Sep. 13, 2022

(54) FIRMWARE INTEGRITY CHECK USING SILVER MEASUREMENTS

(71) Applicant: Absolute Software Corporation, Vancouver (CA)

(72) Inventor: Eugene Khoruzhenko, Redmond, WA (US)

(73) Assignee: Absolute Software Corporation, Vancouver (CA)

( * ) Notice: Subject to any disclaimer, the term of this patent is extended or adjusted under 35 U.S.C. 154(b) by 0 days.

(21) Appl. No.: 16/639,876

(22) PCT Filed: Apr. 10, 2018

(86) PCT No.: PCT/CA2018/050443
§ 371 (c)(1),
(2) Date: Feb. 18, 2020

(87) PCT Pub. No.: WO2019/036795
PCT Pub. Date: Feb. 28, 2019

(65) Prior Publication Data
US 2020/0364340 A1    Nov. 19, 2020

Related U.S. Application Data

(60) Provisional application No. 62/548,815, filed on Aug. 22, 2017.

(51) Int. Cl.
*G06F 11/00*  (2006.01)
*G06F 21/57*  (2013.01)
(Continued)

(52) U.S. Cl.
CPC .......... *G06F 21/572* (2013.01); *G06F 21/577* (2013.01); *G06F 21/73* (2013.01); *G06F 21/74* (2013.01)

(58) Field of Classification Search
CPC ........ G06F 21/572; G06F 21/74; G06F 21/73; G06F 21/577
See application file for complete search history.

(56) References Cited

U.S. PATENT DOCUMENTS 8,776,180 B2    7/2014  Kumar
8,856,771 B2   10/2014  Chalmers
(Continued)

OTHER PUBLICATIONS

F. E. McFadden et al., Supply Chain Risk Mitigation for IT Electronics, Proceedings of 2010 IEEE International Conference on Technologies for Homeland Security (HST), Nov. 8-10, 2010, pp. 49-55, IEEE, Waltham, MA, USA.
(Continued)

*Primary Examiner* — Fatoumata Traore
*Assistant Examiner* — Carlton Johnson
(74) *Attorney, Agent, or Firm* — Damien G. Loveland

(57) ABSTRACT

Measurements of a device's firmware are made regularly and compared with prior, derived measurements. Prior measurements are derived from a set of identical firmware measurements obtained from multiple devices having the same make, model and firmware version number. The firmware integrity status is reported on a data and device security console for a group of managed endpoints. Alerts about firmware changes, which may be potential attacks on the firmware, are given automatically.

18 Claims, 4 Drawing Sheets